Figure 1:
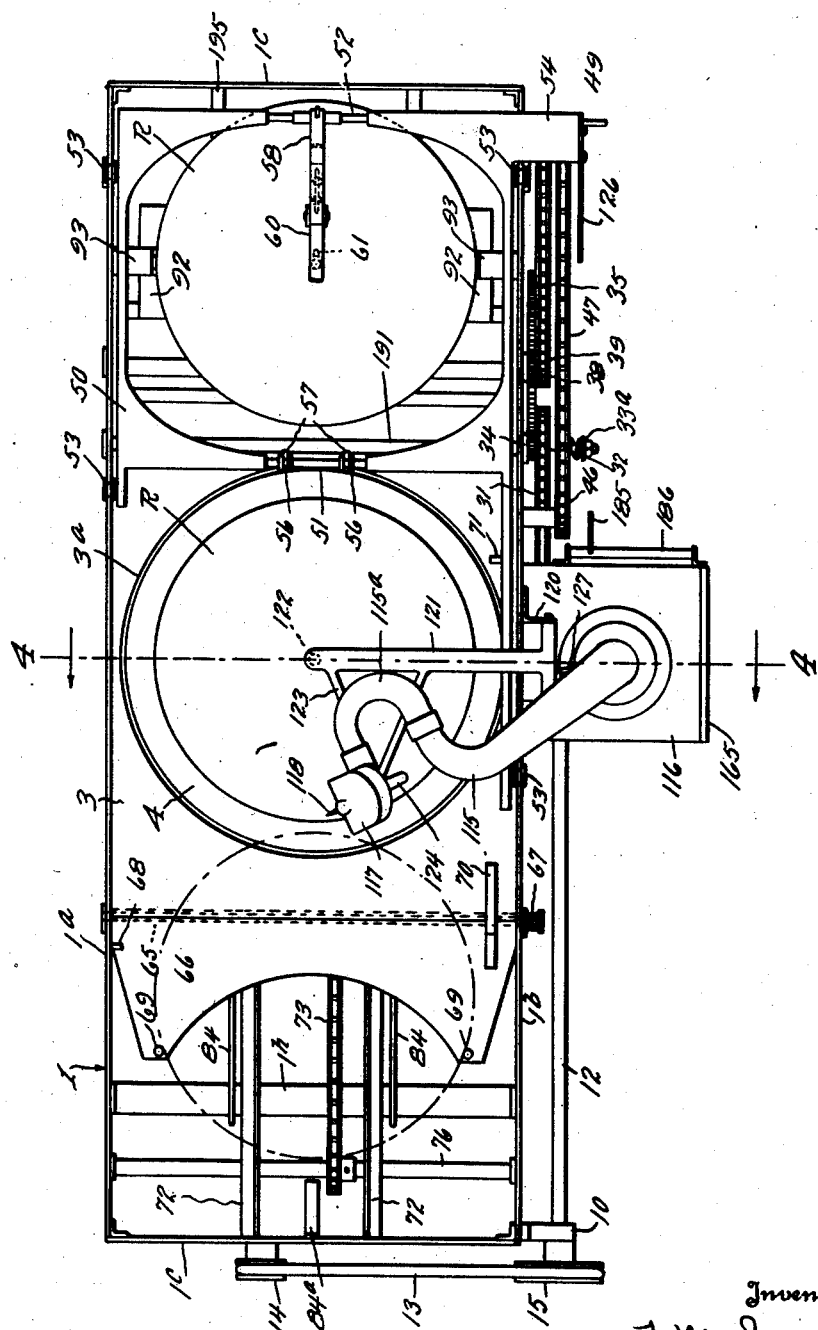

Aug. 28, 1934.　　　T. W. SMALL　　　1,971,584
SOUND REPRODUCING MACHINE
Filed Jan. 4, 1929　　10 Sheets-Sheet 2

Inventor
T. W. Small
By Stull, Brock & West
Attorney

Aug. 28, 1934.　　　T. W. SMALL　　　1,971,584
SOUND REPRODUCING MACHINE
Filed Jan. 4, 1929　　10 Sheets-Sheet 5

Inventor
T. W. Small
By Stull, Brock & West
Attorney

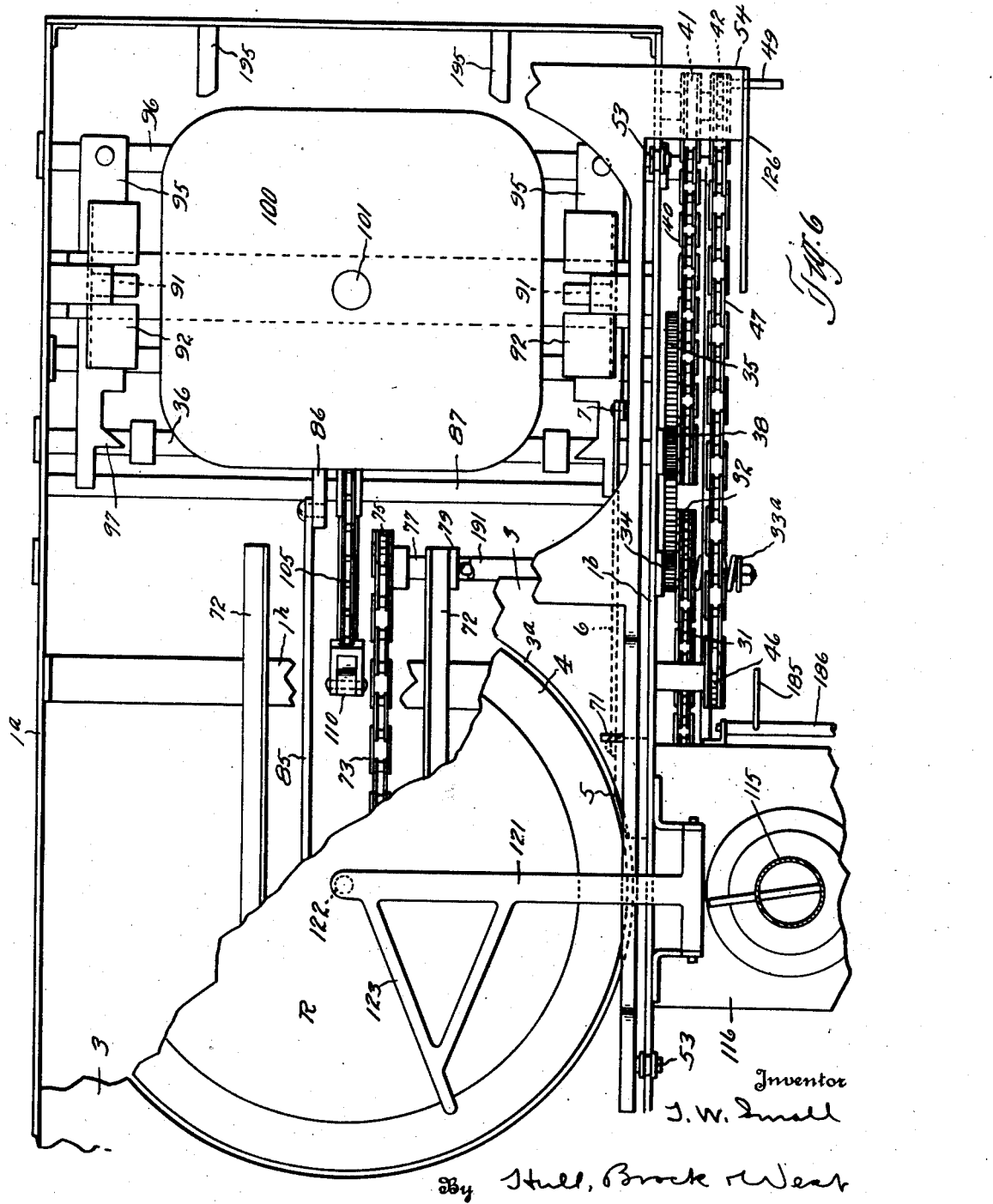

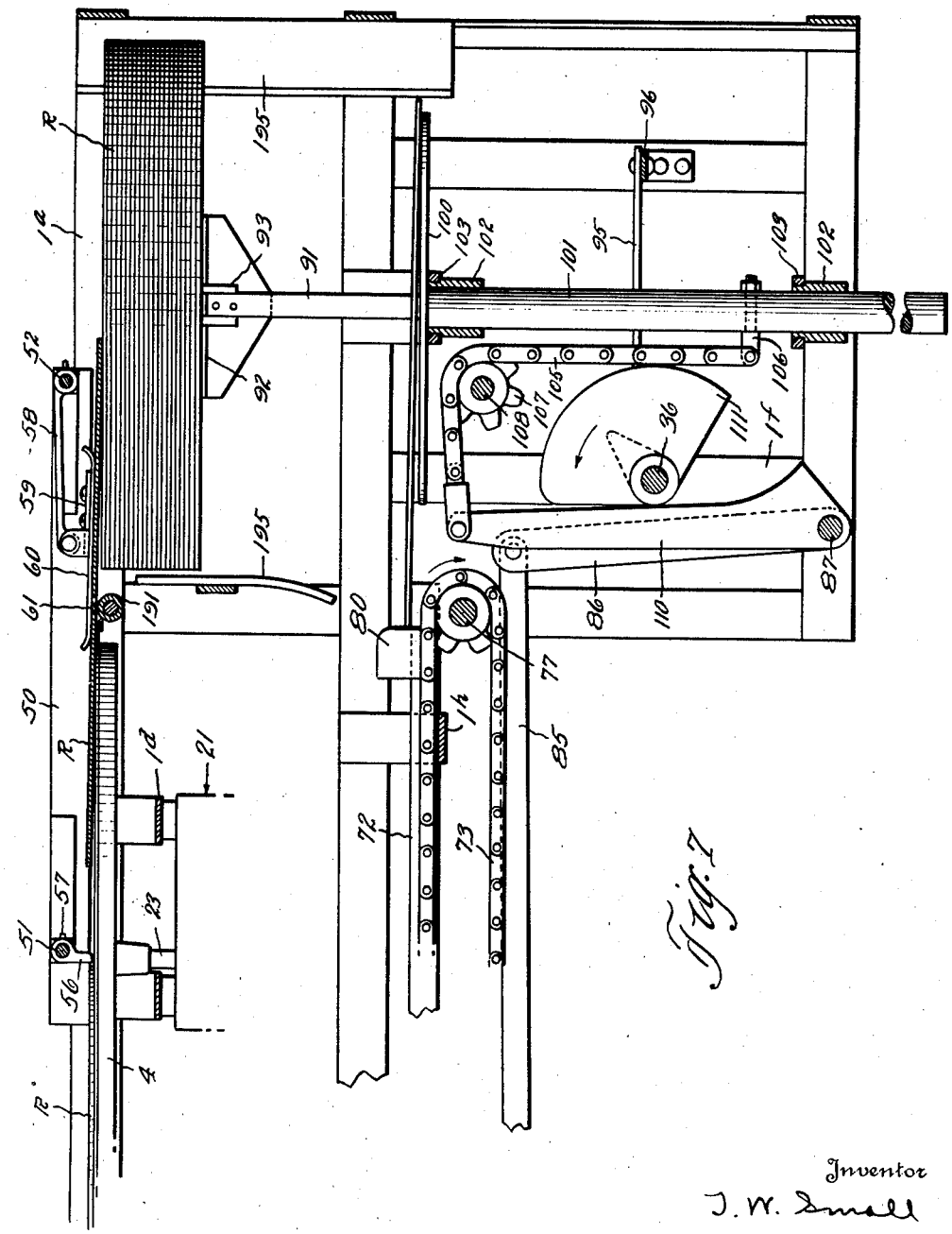

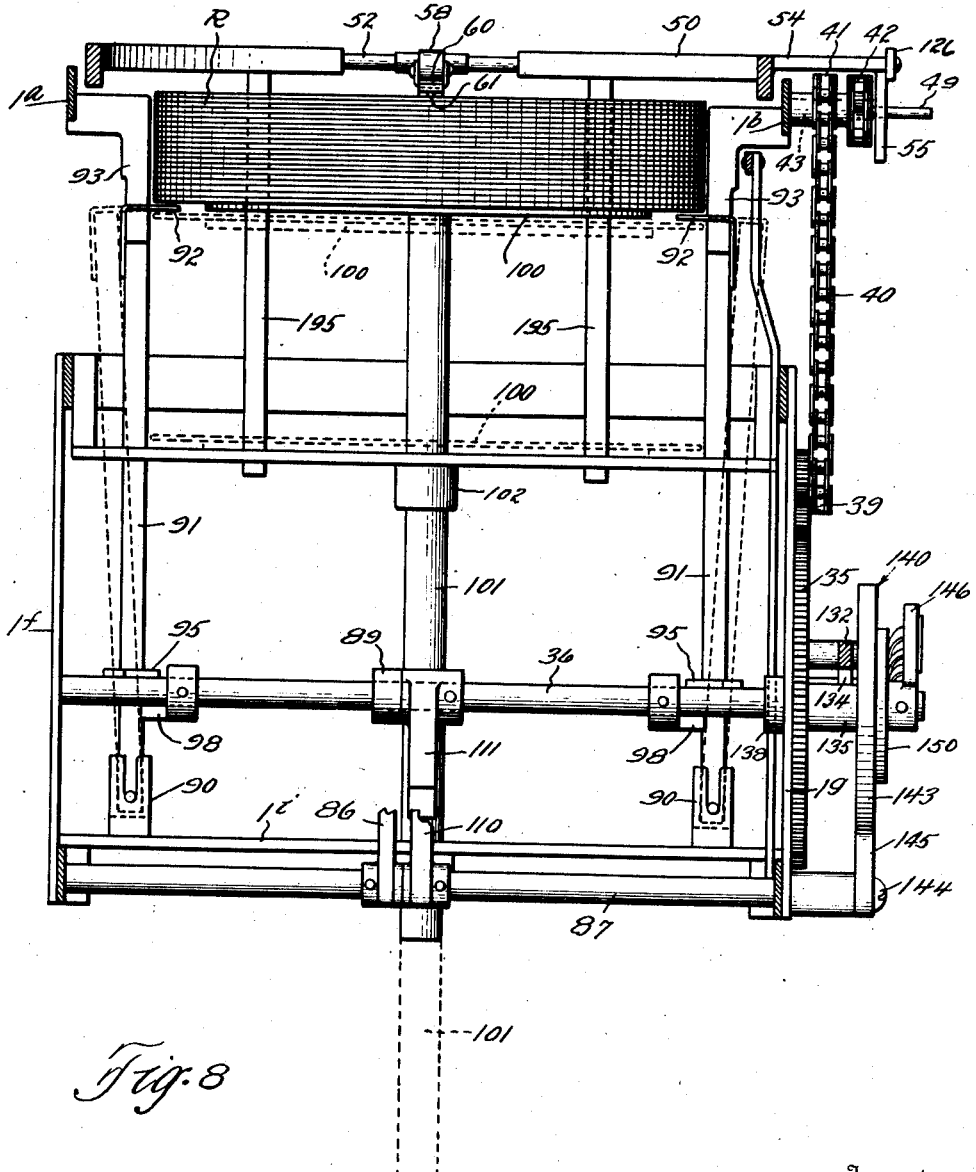

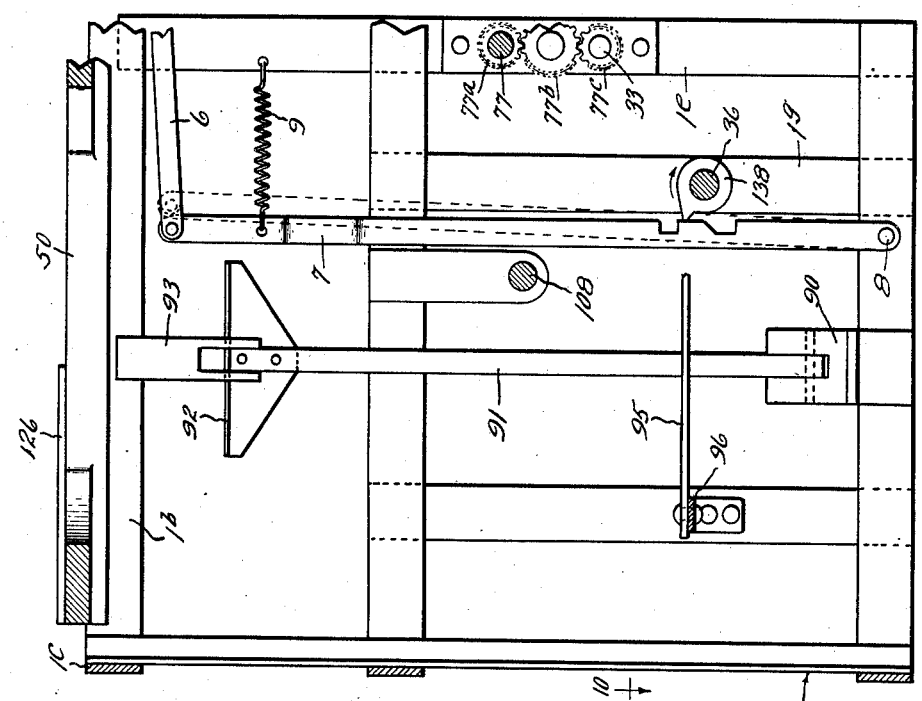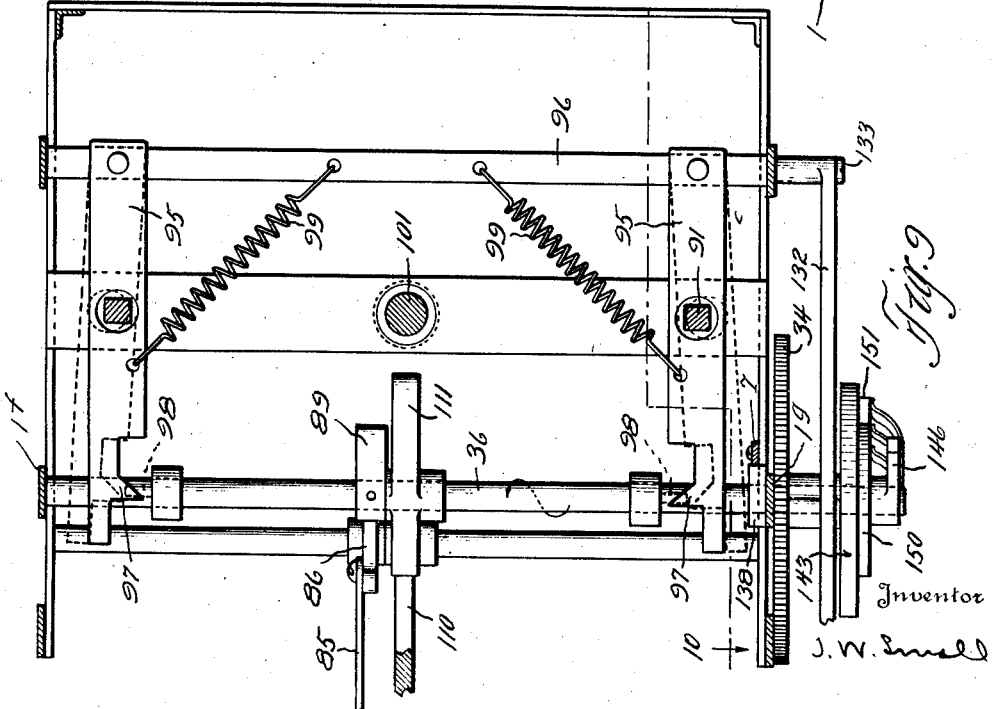

Aug. 28, 1934.  T. W. SMALL  1,971,584

SOUND REPRODUCING MACHINE

Filed Jan. 4, 1929   10 Sheets-Sheet 10

Inventor
T. W. Small
By Hull, Brock & West
Attorney

Patented Aug. 28, 1934

1,971,584

UNITED STATES PATENT OFFICE 1,971,584

SOUND REPRODUCING MACHINE

Thomas Walter Small, Huntington, Ind., assignor, by mesne assignments, to The Capehart Corporation, Fort Wayne, Ind., a corporation of Indiana Application January 4, 1929, Serial No. 330,379

20 Claims. (Cl. 274—10)

This invention has to do with improvements in the class of sound reproducing machines disclosed in my prior applications for Letters Patent, Serial Nos. 209,241 and 291,221, filed, respectively, on July 29, 1927 and July 9, 1928.

My present and my earlier machines are alike in the following respects: They are automatic and are designed to handle disk records. A number of records are supported one upon, or above, another in a magazine; and adjacent the magazine, and substantially in the plane of the top record, is a turntable. Beyond the turntable on the side remote from the magazine is a record reversing and lowering means which acts to turn the records over and deposit them on a track or guideway below the turntable along which the records are moved on their way back to the magazine. A carriage is reciprocable above the plane of the magazine and the turntable and by means of it records are transferred from the magazine to the turntable and from the turntable to the reversing and lowering means. A sound reproducer is moved into and out of cooperation with each record while on the turntable.

In the machine disclosed in the first of the above mentioned applications, the bottom record in the magazine is supported at its diametrically opposed edges only, and the other records rest thereon in face contact with one another. In the machine of the second application, each record in the magazine is supported out of contact with the others and solely at its diametrically opposed edges. With the records supported as above described, there is liability of their warping under relatively high temperature conditions unless the records are made of a special compound that will not soften under abnormally high temperatures. If such an expediency has to be resorted to as the use of a special compound for the records, it very obviously places an undesirable restriction on the machine as it becomes necessary to specify the special records where the machines are intended for use in very warm climates.

It is an object of my present invention to overcome the above difficulty by supporting the records in the magazine, one upon another, with the bottom record resting substantially throughout its area on a flat surface, the lowermost record being so sustained at all times excepting for a very brief period when a record is being returned to the bottom of the stack in the magazine.

Another object of this invention is to provide improved means for shifting the carriage that will positively impart to it an absolutely accurate length stroke, avoiding slight irregularities that were apt to occur in the carriage feed of my former machines if parts of the mechanism should become worn or slightly out of adjustment or yield under undue strain imposed upon them on account of inadequate lubrication or other abnormal conditions.

A further object of the invention is to centralize, in one master element, the control of all the essential submechanisms of the machine so that perfect harmony of action of said mechanisms is assured. The master element, in the present instance, consists of a sturdy shaft with cams or actuators rigidly and preferably permanently secured thereto, as by welding.

In each of my former machines, the sound reproducer is lowered into contact with and is lifted from the record by a cam on the carriage. This causes momentary strains to be imposed on the carriage and on its actuating mechanism which is liable under some conditions to prove detrimental to a smooth and satisfactory operation of the machine.

Therefore, another object of this invention is to provide means actuated by the aforesaid master element for raising and lowering the sound reproducer entirely independently of the carriage.

A still further object of my present invention is to actuate the brake of the turntable by said master element instead of by the carriage or a part movable therewith, as in my earlier machines, so that the turntable may be started a desired interval of time ahead of the lowering of the sound reproducer to insure attainment of its normal speed before the reproduction starts, and to enable it to be stopped at any appropriate place in the cycle of operation irrespective of the carriage position.

It is common to form phonograph records with annular brake actuating grooves located toward center of the disks into which the needle passes from the spiral sound grooves for the purpose of swinging the tone arm inwardly into cooperation with a brake actuating member to stop the turntable. In some makes of records, the brake actuating groove is eccentric to the rotating axis of the record so as to impart an oscillatory movement to the tone arm, while in others it is concentric to and relatively near said axis and communicates with the sound groove through a fast spiral groove.

A still further object of my invention is to provide means that is adapted to be operated by both eccentric and concentric brake actuating grooves for throwing the record shifting mechanism into operation so that the machine is rendered suitable for use with practically all standard makes of records.

Figure 2:
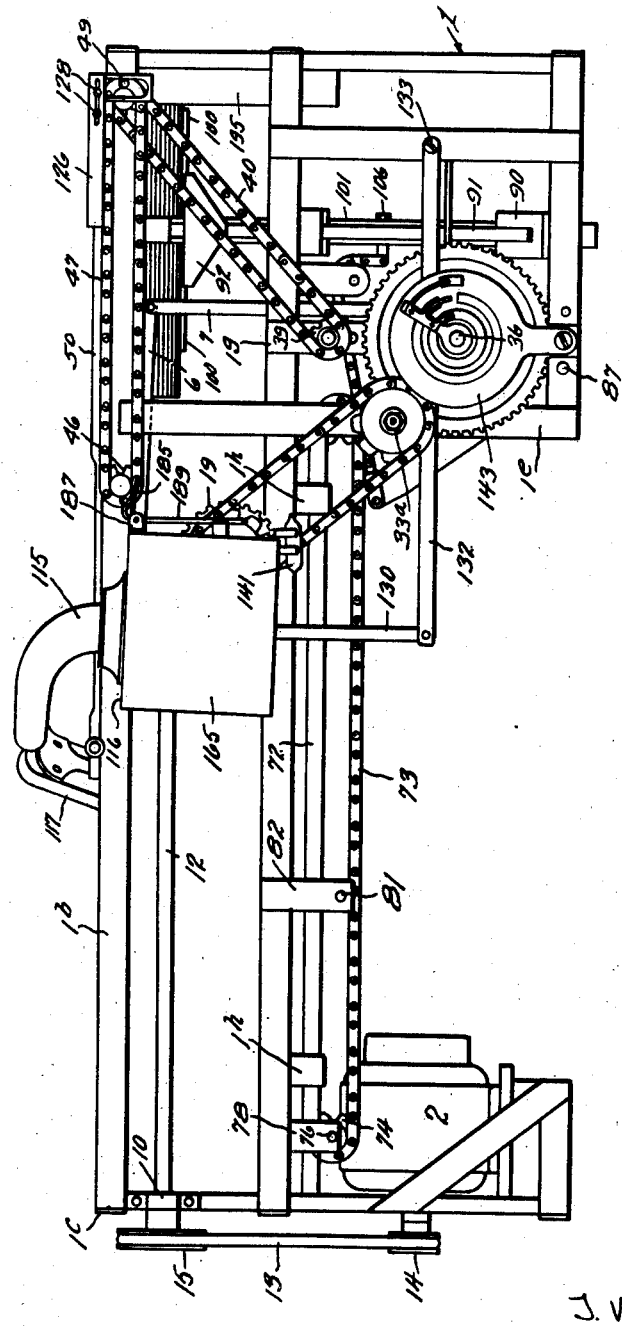
Figure 3:
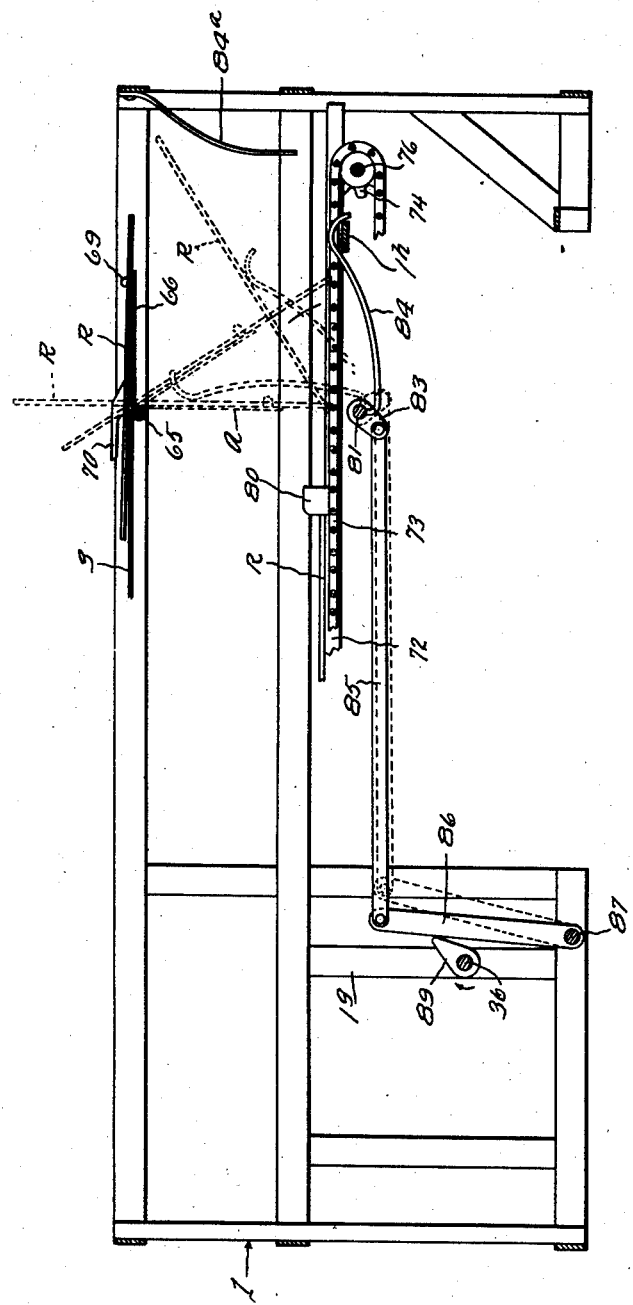
Figure 4:
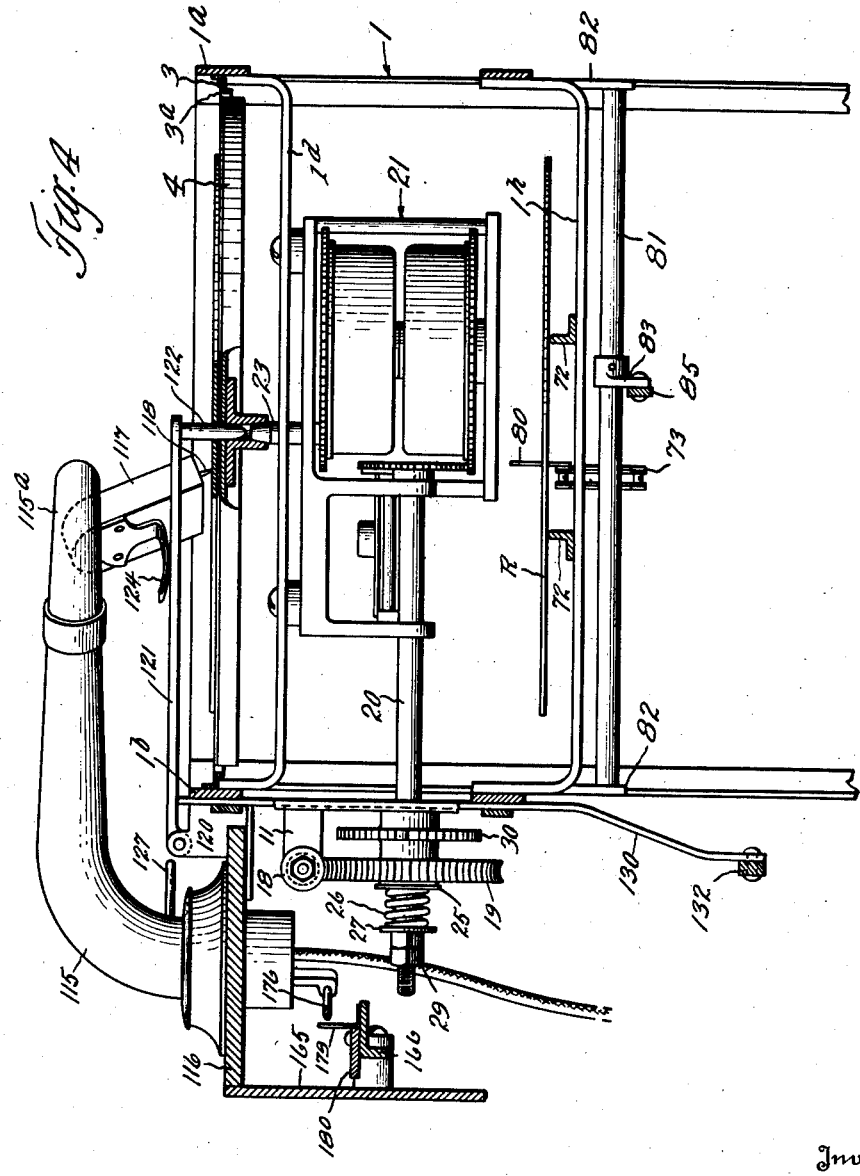
Figure 5:
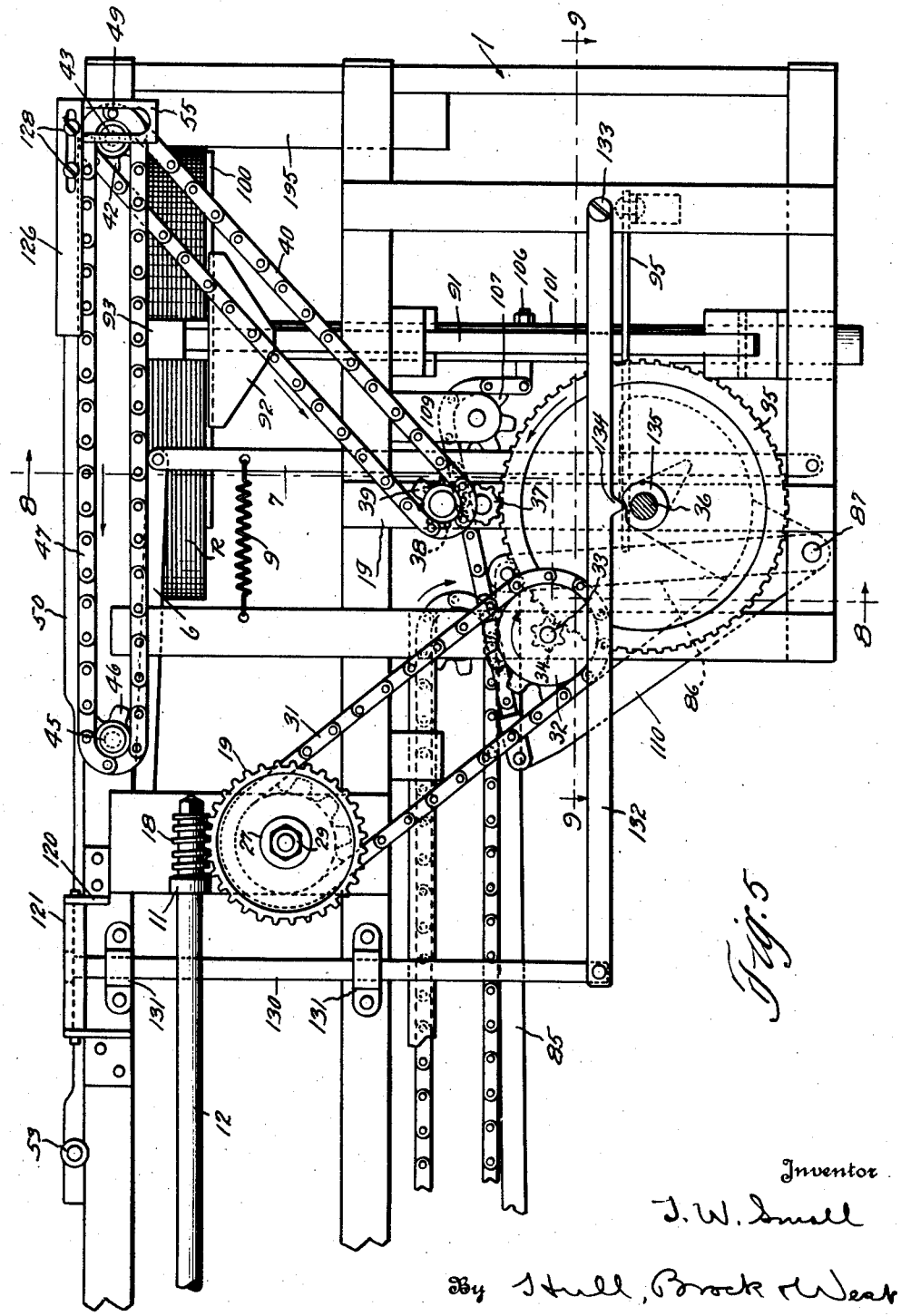
Figure 11:
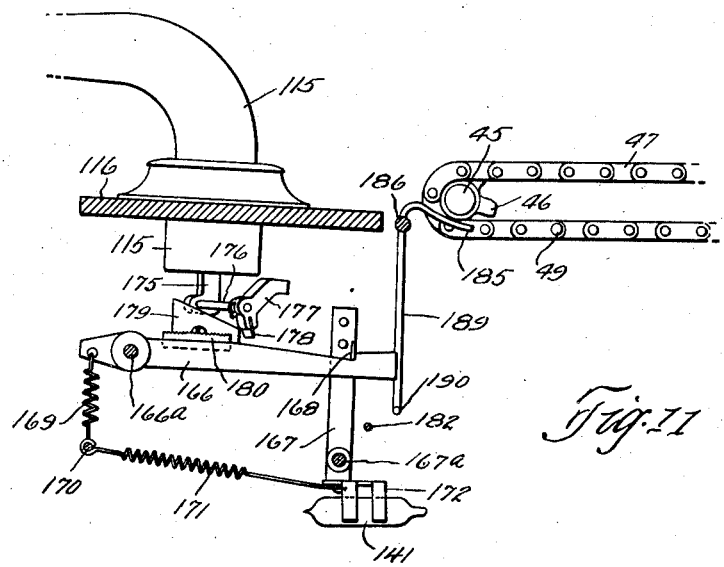
Figure 12:
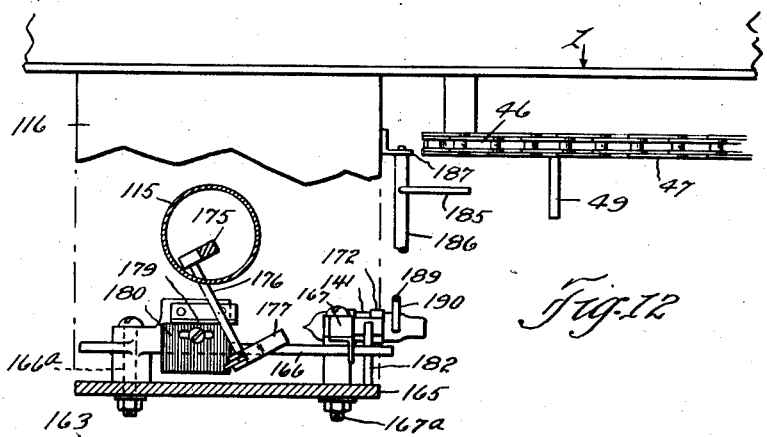
Figure 13:
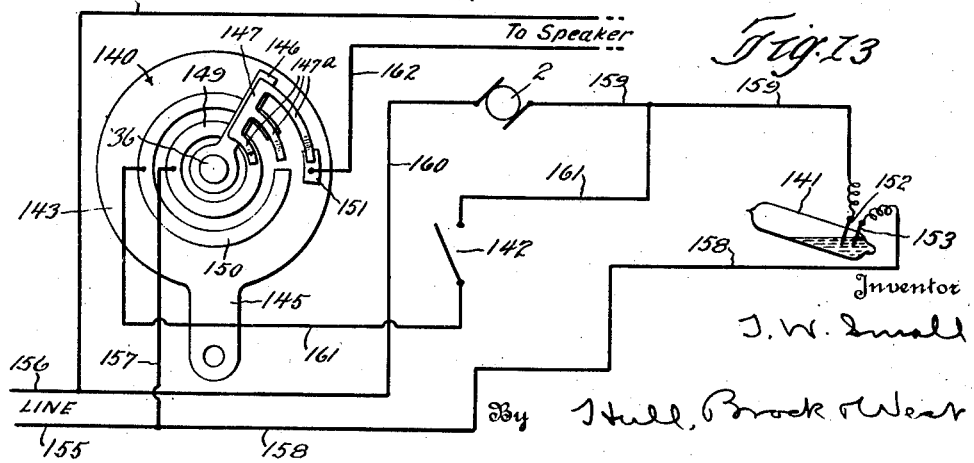

Other objects and advantages of my present invention will appear as I proceed to describe the same in greater detail by reference to the accompanying drawings wherein an embodiment of the invention is illustrated and in which Fig. 1 is a plan view, and Fig. 2 a rear elevation, of a machine constructed in accordance with the invention; Fig. 3 is an incomplete sectional front elevation of the machine, the same being somewhat in the nature of a diagram and showing various positions of the record reversing and lowering means; Fig. 4 is a central vertical section through the machine, substantially on the line 4—4 of Fig. 1, this, and the remaining views, being on a scale considerably enlarged over that of the preceding figures; Fig. 5 is a rear elevation of the right hand end of the machine as the same is viewed in Figs. 1 and 2, or the end of which the magazine is located, the main switch, and the tone arm support with associated parts, being omitted; Fig. 6 is a fragmentary plan view of the machine with parts broken away to reveal certain structural features; Fig. 7 is a central vertical longitudinal section through the magazine end of the machine; Fig. 8 is a transverse vertical section through the magazine end of the machine substantially on the line 8—8 of Fig. 5; Fig. 9 is a horizontal section on the line 9—9 of Fig. 5; Fig. 10 is a vertical section on the line 10—10 of Fig. 9 looking in the direction of the arrows; Figs. 11 and 12 are sectional details in rear elevation and plan, respectively, of the mechanism for operating the switch that controls the starting of the record shifting mechanism; and Fig. 13 is a diagram showing the electric circuits of the machine.

The frame of the machine is designated generally by the reference numeral 1 and it is a built-up structure that is rectangular in plan and whose top is composed of front and rear side rails $1^a$ and $1^b$ that are connected at their ends by cross members $1^c$. The record magazine is situated in the top portion of the right hand end of the frame, as the machine is viewed in Figs. 1, 2, 5, 6 and 7, and occupying the top portion of the opposite end of the frame is the record reversing and lowering means. Suitably supported within the frame below the record reversing and lowering means is an electric motor designated 2 (Fig. 2). Occupying the central portion of the top of the frame 1 and supported by and between the front and rear rails $1^a$ and $1^b$ is a stationary table 3 having a circular opening $3^a$ that is occupied by a record rotating means or turntable 4. The turntable is of usual form, and arranged for cooperation with its periphery is a brake 5 that is movably supported beneath the rear edge of the stationary table 3 and is connected, by a link 6, with the upper end of a lever 7 (Fig. 10) whose lower end is pivoted at 8 to an adjacent portion of the frame 1. A spring 9, whose opposite ends are connected, respectively, to the lever 7 and to a part of the machine frame, tends to rock the lever in a direction to engage the brake 5 with the turntable 4, through the intervention of the link 6.

Rotatably supported in brackets 10 and 11, that extend rearwardly from the frame 1, is a shaft 12. This shaft is driven from the motor 2 through a belt 13 that is engaged over pulleys 14 and 15 that are secured to the motor shaft and to the shaft 12, respectively. Fastened to the end of the shaft 12 opposite that to which the pulley 15 is secured is a worm 18 that meshes with a worm wheel 19, said wheel being loose on the winding shaft 20 of a spring motor that is designated generally by the reference numeral 21 and is suspended within the frame of the machine from a part thereof designated $1^d$. This may be any approved type of phonograph motor, incorporating the usual spring, gearing and governor; and connected in the usual way to the upper end of the drive shaft 23 of the motor is the turntable 4. Driving connection between the worm wheel 19 and the winding shaft 20 is effected through a friction clutch that consists of a member 25, and the adjacent face of the hub of the worm wheel 19 wherewith said members engages, the member being splined to the shaft 20 in a common and well known manner and urged toward the worm wheel by a spring 26 that is compressed between it and a washer 27 that bears against an abutment or nut 28 threaded on the shaft and that is shown as backed by a lock nut 29.

Secured to the worm wheel 19 is a sprocket 30 over which a chain 31 is engaged, said chain being also engaged over a sprocket 32 on a stub shaft 33 that is journaled in a member $1^e$ of the machine frame, said shaft extending a short distance inwardly of said frame member for a purpose presently to appear. The sprocket 32 has a driving connection with the shaft 33 through a friction clutch designated generally by the reference numeral $33^a$, and which may be identical with the one above described. The purpose of this clutch will be explained hereinafter. Fixed to the sprocket 32 is a pinion 34 that meshes with a relatively large gear 35 secured to what I prefer to term a master element or master shaft 36 that is journaled in frame members $1^f$ and $1^g$, said element or shaft projecting a suitable distance rearwardly of the latter frame member. The gear 35 drives, through an idler pinion 37 and a pinion 38, a sprocket 39 that is secured to the latter pinion, said pinions, with the sprocket 39, being journaled on stub shafts that are supported by and extend rearwardly from an adjacent member of the frame 1. A chain 40 is engaged over the sprocket 39 and over a sprocket 41, and the latter sprocket, with one designated 42, is journaled on a stub shaft 43 that is secured to and projects rearwardly from the upper right hand corner of the frame 1, as the machine is viewed in Figs. 5, and 6, for example.

Projecting rearwardly from the top portion of the frame 1 and in substantially the same horizontal plane as and spaced a suitable distance from the stub shaft 43, is a similar shaft 45 on which a sprocket 46 is journaled. Engaged over the sprockets 42 and 46, is what I shall term the carriage operating chain 47 that carries a laterally extending pin 49.

50 designates the carriage by means of which records are shifted from the magazine to the turntable and from the turntable to the record reversing and lowering means. The carriage is a flat rigid structure consisting of front and rear members that are similar to one another and are connected by rods 51 and 52. The front and rear sides of the carriage are supported, through rollers 53, from the front and rear rails $1^a$ and $1^b$ of the machine frame. Depending from a rear extension 54 of the carriage is a slotted member 55 through which the previously mentioned pin 49, on the carriage operating chain 47, extends. It is evident from this that each time the chain is driven through a cycle of operation it will, through the intervention of the pin 49 and the slotted member 55, reciprocate the carriage. And in this connection it may be pointed out that, inasmuch as the pin 49 has a very accurate distance of travel in a linear direction—that is, in the direction of travel of the carriage—a movement of like accuracy is imparted to the carriage. If, through the momentum of the parts, the pin 49 should be carried a fraction of an inch beyond its normal movement, it would have no effect upon the carriage inasmuch as it would move idly within the slot of the member 55. In other words, the driving connection between the chain and carriage is in the nature of a lost-motion connection, the opposed sides of the slot in the member 55 constituting spaced abutments wherewith the pin 49 alternately engages, the lost motion, however, being in a direction normal to the direction of movement of the carriage and therefore not affecting it in any way.

Pivoted on the rod 51 of the carriage are lugs 56, the hub portions of the lugs being circumferentially slotted, as shown in Fig. 1, for the accommodation of pins 57 that are engaged through said slots and driven into the rod 51. The slots are of such a length and the pins 57 are so arranged with respect thereto that the lugs can swing only in one direction from their normal position, the direction of swing being to the left, as the lugs are viewed in Fig. 7. Similarly connected to the rod 52 of the carriage is one end of an arm 58 to whose free end is pivoted a member 59 to which is adjustably connected a shoe 60 having a barb 61 for engagement with the center hole of a record. When the carriage is in normal position, the shoe is retracted with the barb 61 to one side of the hole of the top record in the magazine with the shoe resting upon said record, as clearly shown in Fig. 1. The records are designated by the reference letter R.

Supported by and between the front and rear rails 1ᵃ and 1ᵇ of the machine frame 1, adjacent the edge of the stationary table 3 remote from the record magazine, is a rock shaft 65 to which is secured a leaf 66 that constitutes a part of the record reversing and lowering means. The shaft 65 protrudes beyond the rear rail 1ᵇ where it has applied to it a spring 67 that acts to rotate the shaft in a direction to elevate the leaf 66 and maintain it in a substantially horizontal position in contact with a stop 68 that projects inwardly from the front rail 1ᵃ. Stops 69 rise from the free edge of the leaf 66. A finger 70 is secured to the leaf 66 in a position to be engaged by a pin 71 on the carriage 50 as the latter moves toward the end of its advance stroke, the pin engaging beneath the finger and rocking the leaf downwardly against the tension of the spring 67 to the dotted line position designated a in Fig. 3.

Supported by transverse members 1ʰ of the frame are rails 72 that constitute a track or guideway along which the records are slid in their return to the magazine. Paralleling the rails 72, and arranged between them, is a chain 73 that is engaged about sprockets 74 and 75 supported by shafts 76 and 77, respectively, the former shaft being journaled in brackets 78 that depend from opposed side members of the machine frame, while the shaft 77 is journaled at one end in the previously mentioned frame member 1ᵉ and in a bracket 79 that depends from the adjacent end of the rear rail 72 (Fig. 6), the sprocket 75 being secured to the end of the shaft beyond the bracket 79. Immediately inside the frame member 1ᵉ, as shown in Fig. 10, the shaft 77 has secured to it a pinion 77ᵃ that is driven through an idler 77ᵇ from a gear 77ᶜ that is fastened to the previously mentioned stub shaft 33.

The chain 73 carries a lug 80 for engagement with the edge of a record as the latter rests upon the rails 72.

Returning now to the record reversing and lowering means, a shaft 81 is journaled at its ends in brackets 82 that depend from front and rear horizontal members of the machine frame, said shaft being approximately in the vertical plane of the rock shaft 64, and an arm 83 is secured to the shaft 81 near its longitudinal center. Record lowering fingers 84 are carried by and are spaced along the shaft 81, on opposite sides of the arm 83, said fingers lying in vertical planes just outside the rails 72, as will be seen from Fig. 1. A leaf spring 84ᵃ extends downwardly and inwardly from the adjacent cross member 1ᶜ between the vertical planes of the fingers 84 for a purpose that will presently appear. The free end of the arm 83 is connected, through a link 85, with the upper end of a lever 86 that is pivotally supported upon a transverse shaft 87 disposed within the lower part of the magazine end of the machine. The lever 86 is adapted to be rocked by a cam 89 that is secured to the master element or shaft 36, while the weight of the fingers 84 tends to retain the associated parts, including the lever 86, in normal position.

I will now describe the record magazine. Supports 90 rise from the front and rear ends of a frame member 1ⁱ that extends transversely of the lower portion of the machine frame, and within these supports are pivoted the lower ends of posts 91 that carry record supporting ledges 92 at their upper ends. Said ends of the posts are adapted to swing outwardly, as indicated in dotted lines in Fig. 8, and they are guided in their movements by depending members 93 that suitably cooperate with the ledges 92 and are secured to the front and rear rails 1ᵃ and 1ᵈ of the machine frame. The posts 91 extend through holes in plates 95 that are pivotally connected at one end to a cross member 96 that is supported by and between opposed members of the machine frame, and at their opposite ends said plates rest upon the master element or shaft 36 and have cam portions 97 for engagement with wipers 98 that are secured, as by welding, to the element or shaft 36. As said element or shaft rotates in the direction indicated by the arrow in Fig. 9, the wipers 98 engage the cam portions 97 of the plates 95 and swing said plates outwardly against the tension of springs 99 that have one of their ends connected to said plates and their opposite ends anchored to the cross member 96. Obviously as the plates 95 are swung inwardly and outwardly, like movement is imparted to the upper ends of the posts 91.

100 is an elevator that is in the nature of a flat plate and is supported by a plunger 101 that is guided for vertical movement within sleeves 102 that depend from bars 103 supported transversely of the machine frame between opposed side members thereof. One end of a chain 105 is connected to the plunger 101 by means of a bolt 106, and the chain is engaged over an idler sprocket 107 that is supported by a shaft 108 which, in turn, is sustained by brackets 109 that are carried by opposed members of the machine frame. The opposite end of the chain 105 is attached to the free end of an arm 110 that is pivoted on the previously mentioned shaft 87 alongside the lever 86. Arranged for engagement with the arm 110 is a cam 111 that is secured to the master element or shaft 36. It will be seen from the foregoing description that as said cam is rotated in the direction indicated by the arrow in Fig. 7, the arm 110 will be swung to raise and lower the elevator 100 through the intervention of the chain 105 and plunger 101.

The tone arm of the sound reproducing apparatus is designated 115 and it is supported for swinging movement in a substantially horizontal plane by a shelf 116 that extends rearwardly from the machine frame to the rear, and slightly below the plane, of the turntable. As shown in Figs. 2 and 11, the shelf is inclined very slightly and in such direction as will bias the tone arm toward the center of the record and thus relieve the sound-groove-and-stylus couple of undue burden in swinging the tone arm. While the major portion of the tone arm is mounted to swing only horizontally, the front portion, designated 115a, is so connected to the major portion as to be capable of vertical swinging movement. It is to the free end of the portion 115a that the sound reproducer or sound box 117 is connected. The reproducer or sound box is equipped with the usual needle or stylus 118 and while any approved type of reproducer or sound box may be employed, I prefer to use the modern electrical pick-up apparatus with which is employed an electrically operated loud speaker.

Secured to and projecting rearwardly from the rail 1b of the machine frame are brackets 120 by and between which is pivotally supported the elongated hub of what I shall term the tone arm lifter 121. This lifter is in the nature of an arm that is arranged in transverse alignment with the rotating axis of the tone arm and at its outer end carries a centering pin 122 for cooperation with the hole of a record on the turntable, the pin being tapered at its lower end so as to assist in centering the record on the turntable. The lifter 121 has a laterally extending rail 123 along which a shoe 124, that extends rearwardly from the reproducer 117, is adapted to travel during the return movement of the reproducer, as will hereinafter more fully appear. During the playing of a record, the shoe 124 is free of the rail 123. It may be explained at this time, however, that when the lifter 121 is elevated to disengage the stylus of the reproducer from a record, upon the completion of the playing of latter, the tone arm is swung to normal position, with the reproducer adjacent the periphery of the turntable, by a pusher 126 on the rearward extension 54 of the carriage 50, which pusher is arranged to engage a pin 127 that extends forwardly from the pivoted end of the tone arm. So as to make possible a very accurate positioning of the reproducer with respect to the record on the turntable, the pusher 126 is adjustable, this end being accomplished in the present instance by slotting said pusher for the accommodation of the screws 128 by means of which it is connected to the carriage.

The tone arm lifter 121 is raised and lowered by mechanism including a bar 130 that is guided for vertical movement within stirrups 131 secured to the rear of the machine frame, said mechanism also involving a lever 132 to the free end of which the lower end of the bar 130 is pivoted and which lever, in turn, is pivotally connected at its opposite end to a part of the machine frame, as indicated at 133. The lever 132 has a depending portion 134 that bears upon a cam 135 fixed, as by welding, to the master element or shaft 36 to the rear of the large gear 35. From the profile of the cam 135, as the same is shown in Fig. 5, it is evident that the tone arm will be elevated through the intervention of the mechanism described with the stylus of the reproducer out of contact with the record at all times excepting when the master element or shaft 36 is in normal position.

Attention is here directed to a cam 138 that is fastened to the master element or shaft 36 immediately inside the frame member 19, and which coacts with the previously mentioned lever 7 to actuate the brake 5 of the turntable. (See Figs. 6, 9 and 10.) During the playing of a record, the cam 138 occupies the position shown in Fig. 10 and holds the brake 5 out of contact with the periphery of the turntable; but an instant after the master shaft has started to rotate, the nose of the cam 138 is removed out of contact with the cam engaging part of the lever 7, releasing said lever and permitting the spring 9 to throw it in a direction to set the brake. Obviously, from the nature of the cam, the brake remains effective until just prior to the completion of one revolution of the master shaft.

The electric circuits through which the machine is operated and controlled are shown in the diagram of Fig. 13, and the same involve a main switch designated generally by the reference numeral 140, an auxiliary switch 141, and a switch 142 that may be a manually operated or coin controlled switch, depending upon the use to which the instrument is to be put.

The main switch is located on the rear side of the magazine end of the machine and, according to the present embodiment, consists of a block 143 of suitable insulating material through a central aperture of which the rear portion of the master shaft 36 extends, the block 143 being held against rotation by fastening means 144 that secures an extension 145 of said block to an adjacent part of the machine frame. Fastened to the rearward end of the master shaft 36 is an arm 146 which carries a comb-like member 147 having three fingers or brushes 147a. The member 147 is made of brass or other suitable electrical conducting material. Carried by the block 143 are contact members arranged to be engaged by the fingers or brushes 147a and one, designated 149, is in the nature of a ring wherewith the inner brush or finger 147a is constantly in contact. The intermediate finger or brush is arranged to engage a contact segment 150 that is almost a complete annulus, and a contact member 151 is arranged beyond the gap of the contact member 150 and in the path of the outer tongue or brush 147a. As above explained, the inner finger or brush 147a is in constant engagement with the contact ring or member 149; and when the master shaft 36 is in normal position the outer finger or brush rests upon the contact member 151, while the intermediate finger or brush occupies the gap in the contact member 150.

The auxiliary switch 141 is of the mercury type and consists of a closed vessel of glass or other suitable non-conducting material containing a quantity of mercury and equipped with two contact points 152 and 153 that become submerged in the mercury when the vessel is tilted in a direction to cause the mercury to accumulate about said points.

The current is obtained from a suitable source through what is designated in Fig. 13 as the "Line", and the opposite sides thereof are represented by the conductors 155 and 156. The former has two branches 157 and 158, the former leading to the contact ring or member 149, and the latter to the contact point 153 of the auxiliary switch 141. When the switch 141 is closed, as by being tilted so as to cause the mercury to bridge the contact points 152 and 153 thereof, the current flows through said switch and thence through a conductor 159 to the motor 2 from where the current returns to the other side of the line through a conductor 160. The manual or coin-controlled switch 142 is included in a conductor that leads from the contact member 150 of the main switch to the conductor 159. The electrical sound reproducing apparatus of the machine, or the so-called "speaker", is energized by current conveyed to it through a conductor 162 that leads from the contact member 151 of the main switch, the current returning through a conductor 163 to the side of the "Line" represented by the conductor 156.

The auxiliary switch 141 is closed, through suitable intervening mechanism, by the tone arm, as the latter is swung toward the center of a record by means of the brake actuating groove; and said switch is opened by the carriage shifting mechanism, details of the instrumentalities through which these ends are accomplished being illustrated in Figs. 11 and 12.

A support 165 depends from the rear edge of the shelf 116, and to the inner side of the said support are pivotally connected a latch 166, and a lever 167. The pivots of the latch and lever are designated, respectively, 166a and 167a. The lever 167 is equipped with a keeper 168 wherewith the nose of the latch is adapted to engage, the latch being urged toward keeper engaging position by a spring 169 that has one of its ends connected to the end of the latch remote from its keeper engaging end, while the other end of said spring is anchored to a post 170 that is carried by the support 165. A second spring 171 is also connected to said post and to the lower end of the lever 167, said spring tending to swing the lever in a clockwise direction as the same is viewed in Fig. 11. The auxiliary or mercury switch 141 is attached to the lower end of the lever 167 by a suitable clip 172.

Rigidly secured to and depending from the tone arm 115 is a bracket 175, and a pin 176 extends laterally from said bracket. Pivotally supported for a limited swinging movement by the outer end of the pin 176 is a weighted dog 177, the nose 178 of which is formed of a thin blade of hardened metal. Carried by the latch 166 are a cam plate 179, and a ledge 180 whose top surface is milled or corrugated to provide relatively closely spaced serrations.

When a record is being played that is formed with a brake actuating groove consisting of a spiral groove leading into a concentric groove and which, as will be remembered, is close to the center of the record, the tone arm is swung far enough through the entrance of the stylus into the brake actuating groove to swing the pin 176 into contact with the cam plate 179 and, through said plate, depress the latch 166 against the tension of the spring 169 and out of holding engagement with the keeper 168, thereby to release the lever 167 and allow it to be swung over and against a stop 182, that is carried by the support 165, thereby to tilt the auxiliary or mercury switch 141, sufficiently to close it.

When a record having an eccentric brake actuating groove is being played, and said groove is at no point close enough to the center of the disk to swing the tone arm inwardly sufficiently to engage the pin 176 with the cam plate 179, the nose 178 of the dog 177 is drawn across the serrated face of the ledge 180 and is so angularly disposed with respect to the ledge that upon a return movement of the pin and dog, occasioned by the eccentricity of the brake actuating groove of the record, the nose of the dog, being prevented from sliding across the serrated face of the ledge 180, swings downwardly and depresses the latch and disengages it from the keeper 168 thereby to allow the lever 167 to swing over against the stop 182 and close the switch 141.

As is clear from the above description of the electrical circuits, the motor 2 is energized when the switch 141 is closed and, upon the energization of the motor, the carriage operating chain 47 is moved through the connections already described. As the pin 49 thereon swings about the sprocket 46 it engages a trip 185 that extends from a rock shaft 186 that is pivotally supported in brackets 187 on the shelf 116, and rocks said shaft. Depending from the shaft 186 is an arm 189 whose lower end is turned rearwardly as indicated at 190, for engagement with the side of the lever 167. Consequently, each time the carriage operating chain 47 performs a cycle of operation, the pin 49 strikes the trip 185 and rocks the shaft 186 thereby to swing the arm 189 in a direction to restore the lever 167 to normal position where it is reengaged and held by the latch 166.

Before describing the operation of the machine, attention is directed to a roller 191 that is supported by and between the rails 1a and 1b immediately adjacent and parallel to the side of the stationary table 3 nearest the magazine.

In considering the operation of the machine, it will be assumed that the switch 142 is closed and that a record is being played, and under these conditions all parts of the apparatus are at rest excepting the turntable 4, the spring motor 21 that drives it, and the tone arm whose free end is being slowly moved toward the center of the record as the stylus 118 traverses the sound groove thereof. At this time, the main switch is in the position shown in Figs. 2 and 13, and the turntable brake 5 is held in ineffective position by the cam 138 (Fig. 10).

Also, during this time, the elevator 100 is sustained in its elevated position with the records in the magazine supported directly upon it and slightly above the plane of the ledges 92, as best shown in Fig. 8.

As the reproduction of the record is completed the stylus moves into the so-called brake actuating groove of the record thereby to swing the tone arm to its extreme inward position and either engages the pin 176 with the cam plate 179, or the dog 177 with the serrated surface of the ledge 180 (depending upon whether the brake actuating groove of the record is concentric or eccentric with respect to the rotating axis of the record). In either event the latch 166 will be depressed, as hereinbefore described, and thus disengaged from the keeper 168 of the lever 167 thereby to release the lever and permit it to be swung by the spring 171 into contact with the stop 82. This rocking of the lever tilts the switch 141 and causes the mercury therein to bridge the contents 152 and 153 and close the circuit to the motor 2 through conductors 158, 159 and 160 (Fig. 13).

When the motor is energized, it drives, through the connections comprising the belt 13, and pulleys 14 and 15, the shaft 12. The rotation of this shaft is imparted, through the worm 18 thereon, to the worm wheel 19 and sprocket 30. The winding shaft 20 of the spring motor 21 is driven from the worm wheel 19 through the friction clutch member 25 that is fixed against rotation on the shaft 20, until the power stored up in the spring of the motor 21 is superior to the friction created between said clutch member and the face of the worm wheel wherewith it cooperates by the compression spring 26. Thus, each time the electric motor 2 is operated, it restores the spring of the motor 21 to its maximum tension.

From the sprocket 30, the master element or shaft 36 is rotated through the chain 31, sprocket 32 and shaft 33 wherewith it has driving connection through the clutch 33a, pinion 34 that is fastened to said shaft, and large gear 35 wherewith the pinion 34 meshes and which, in turn, is secured to the shaft 36. As soon as the master shaft starts to turn, it removes the outer finger or brush 147a from the contact member 151 of the main switch, thereby opening the circuit to the electrical sound reproducing apparatus or "speaker" (not shown) and immediately thereafter the intermediate finger or brush engages the contact member 150 thereby establishing a circuit from the side of the "Line" represented by the conductor 155, through the conductor 157, contact ring or member 149, the inner and intermediate fingers or brushes 147a, contact member 150, conductors 161 and 159 to the motor 2 from which the current returns through the conductor 160 to the side of the "Line" represented by the conductor 156. The motor is now receiving current through two circuits, one involving the auxiliary switch 141, and the other involving the main switch 140 and the switch 142.

The carriage operating chain 47 is driven, through the connected sprockets 41 and 42, chain 40, sprocket 39, gear 38 that is connected thereto, and the idler pinion 37, from the large gear 35. Therefore, as soon as the motor 2 is set in operation the pin 49 moves into engagement with the opposite side of the slot in the member 55 from that in contact with which it normally rests and advances the carriage 50 toward the turntable. At the same time the cam 135 swings the lever 132 upwardly thereby to elevate the lifter 121, through the intervention of the bar 130, and raise the reproducer 117 so as to withdraw the stylus 118 out of contact with the record. The elevation of the outer end of the lifter 121 also withdraws the centering pin 122 from the hole of the record on the turntable.

Now, as the carriage 50 advances, the barb 61 of the shoe 60 drops into the hole of the topmost record in the magazine and shoves said record over the roller 191 and across the adjacent edge of the stationary table 3 onto the turntable 4, the lugs 56 on the rod 51 of the carriage in the meantime engaging the edge of the record that has just been played and shoving it from the turntable onto the leaf 66 of the record reversing and lowering means. By reason of the adjustability of the shoe 60, the positioning of the records on the turntable may be made very exact without necessity for extreme accuracy in the manufacture of the parts. As the carriage approaches the end of its stroke, the pin 71 thereon engages the finger 70 of the leaf 66 and swings the leaf downwardly, rocking the shaft 65 to which it is secured against the tension of the spring 67. While this is occurring, the cam 89 on the master element or shaft 36 engages the lever 86 and swings it so as to rock the shaft 81 through the intervention of the link 85 and arm 83. The record lowering fingers 84, on the shaft 81, are swung upwardly by this action into substantially vertical position, as shown in dotted lines in Fig. 3, and into contact with the record that is on the leaf 66 and, due to the tilting of the leaf, has slid downwardly into contact with the stops 69. When in this position, the lower edge of the record is in engagement with the rails 80 72 and then, as the carriage starts on its return movement and withdraws the pin 71 from the finger 70 and allows the spring 67 to swing the leaf upwardly, the record is tilted backwardly against the fingers 84 and by them is lowered 85 gently onto the rails 72 as the cam 89 swings downwardly and withdraws from the lever 86. The ease with which the record is deposited upon the rails is promoted by the leaf spring 84a that extends downwardly and inwardly from the adjacent end of the machine frame, said spring also serving to advance the record along the rails for a purpose which will presently appear.

As the carriage approaches its extreme advanced position, the pusher 126 engages the pin 127 on the tone arm 115 and swings the outer end of the tone arm, with the reproducer, toward the periphery of the turntable, the shoe 124 through which the reproducer is sustained sliding along the rail 123 of the lifter 121. Thus the reproducer, with its stylus, is shifted to a position adjacent the edge of the record that is now on the turntable and is next to be played. It is not, however, until after the depending portion 134 of the lever 132 drops into the depression of the cam 135 that the reproducer is lowered so as to engage the stylus 118 with the sound groove of the record on the turntable; and prior to this, the cam 138 swings the lever 7 in a direction to withdraw the brake 5 out of contact with the turntable so as to allow the same, through the action of the spring motor 21, to attain its normal speed.

While the carriage is at the end of its advanced stroke the pin 149 on the carriage operating chain moves downwardly and engages the trip 185 thereby to swing the arm 189 inwardly to restore the lever 167 to its normal position wherein it is held by the latch 166. When so restored, the switch 141 carried by said lever assumes a position wherein the mercury that it contains is withdrawn from the contact points 152 and 153 so as to open the circuit to the motor 2 that was formerly established through such switch. The motor is now receiving its current through the circuit controlled by the main switch and switch 142. The motor therefore continues to function and the master shaft 136 continues to rotate until the cycle of operation is completed which is the equivalent of a complete rotation of the master shaft.

The chain 73, that is located between and parallels the rails 72, is driven through the stub shaft 33, pinions 77c, 77b and 77a, and the shaft 77 (Fig. 10), said shaft having secured to its inner end the sprocket 75 over which the chain is engaged, the chain idling over the sprocket 74 that is carried by the shaft 76. The lug 80 on the chain 73 engages the records as they are deposited by the reversing and lowering means onto the rails 72 and moves them therealong to the magazine; but it should be explained in this connection that at the conclusion of each cycle of operation, said lug swings up over the sprocket 74 and engages the edge of the record which has just been lowered on to the rails 72 and pushes said record to a position beneath the turntable, as indicated in Fig. 3, where it remains until the next cycle of operation is inaugurated.

At the beginning of a cycle of operation the raised portion of the cam 111 withdraws from the arm 110, allowing the same to swing to the position shown in Fig. 7, so as to relax the chain 105 and allow the plunger 101 to descend and carry the elevator 100 to its lowest position which is slightly below the plane of the rails 72. At the same time the chain 73 is moved as above described to advance the lug 80 and push the record that is ahead of it along the rails and off the ends thereof onto the elevator 100. Just as the lug 80 completes its advancement of the record the elevator starts upwardly, the elevated portion of the cam 111 having, in the meantime, swung around into contact with the arm 110 so as to swing the same to its normal position wherein it supports the elevator in the position shown in Fig. 5.

As the elevator approaches its normal position, the wipers 98 on the master shaft 36 engage the cams 97 of the plates 95 and swing them outwardly against the tension of the springs 99, thereby to impart like movement to the posts 91 and withdraw the ledges 92 from beneath the records in the magazine allowing them to come to rest on the record supported by the elevator. As soon as the elevator has attained its highest position, the wipers withdraw from the cams 97 of the plates 95, allowing said plates to snap inwardly under the influence of their springs and project the ledges 92 beneath the records of the magazine and in a position to support them, when the elevator is lowered for the next record. The records are maintained in proper position as they progress upwardly through the magazine by guides 195.

The motor 2 continues to receive current until the intermediate brush of the main switch rides off the end of the contact member 150 and opens the motor circuit. When this occurs the record shifting mechanism stops, and the circuit to the "speaker" will have been established through the outer brush of the main switch and the contact member 151. Now with the turntable released and the sound reproducer lowered with its stylus in contact with the record, the playing will proceed as before.

If, from any cause, as the breaking of a record, the mechanism should become jammed, injury thereto will be prevented by the slipping of the friction clutch 33ª. This clutch is adjusted so that its friction is sufficient at all times to drive the mechanism under normal load, but not a great deal in excess thereof.

Having thus described my invention, what I claim is:

1. In a machine of the class set forth, the combination of a magazine for holding a batch of disk records and comprising a member for supporting a record substantially throughout its area and movable toward and from the batch, means for sustaining the records of the batch while said member is so moved, means for moving the member, a sound reproducer, record rotating means in operative relation thereto, and mechanism for moving records between the record rotating means and the magazine while the aforesaid member is withdrawn from the batch.

2. In a machine of the class set forth, the combination of a magazine for holding a batch of disk records and comprising a member for supporting a record substantially throughout its area and movable toward and from the batch, means for sustaining the records of the batch while said member is so moved, means for moving the member, a sound reproducer, record rotating means in operative relation thereto, and mechanism for removing records from and returning them to the magazine while the aforesaid member is withdrawn from the batch and which mechanism serves to present the records to the rotating means during the interim between their removal from and their return to the magazine.

3. In a machine of the class set forth, the combination of a magazine including laterally shiftable supports for a batch of disk records and a member for supporting a record substantially throughout its area and movable up and down between a low position and a high position, the latter position being above the plane of said supports, means for moving said member up and down, a sound reproducer, record rotating means in operative relation thereto, and mechanism for moving records between the record rotating means and the magazine while the aforesaid member is below high position.

4. In a machine of the class set forth, the combination of a magazine for holding a batch of disk records one upon another in horizontal position, a record rotating means adjacent the magazine, a sound reproducer in operative relation thereto, laterally shiftable supports for sustaining the batch of records in the magazine, a member movable up and down below the batch of records from a low position to a high position above the plane of said supports, means for moving said member up and down, record lowering means beyond the side of the rotating means remote from the magazine, means for shifting records from the top of the magazine onto the rotating means and from the rotating means to the lowering means, and mechanism for shifting records from the lowering means to the aforesaid member when the latter is below high position.

5. In a machine of the class set forth, the combination of a magazine for holding a batch of disk records one upon another and in horizontal position, a horizontal turntable adjacent the magazine, a sound reproducer in operative relation to the turntable, record lowering means beyond the side of the turntable remote from the magazine, laterally shiftable supports for sustaining the batch of records in the magazine, an elevator movable up and down beneath the batch of records from a low position to a high position above the plane of said supports, mechanism for transferring records from the magazine to the turntable and from the turntable to the lowering means, and mechanism for transferring records from the lowering means to the elevator when the latter is below high position.

6. In a machine of the class set forth, the combination of a magazine for holding a batch of disk records one upon another and in horizontal position, a horizontal turntable adjacent the magazine and in approximately the plane of the top record of the batch, a sound reproducer in operative relation to the turntable, record lowering means beyond the side of the turntable remote from the magazine, a guideway extending from the lowering means to the magazine, laterally shiftable supports for sustaining the batch of records in the magazine, an elevator movable up and down beneath the batch of records from a low position to a high position above the plane of said supports, mechanism for transferring records from the magazine to the turntable and from the turntable to the lowering means, and mechanism for moving records from the lowering means along said guideway to the elevator when the latter is below the plane of said guideway.

7. In a machine of the class set forth, in combination, a magazine for a batch of disk records including laterally displaceable supports for sustaining the records in a substantially horizontal position, an elevator movable up and down below the batch of records between a low position and a high position that is above the plane of said supports, and means for so moving said elevator, a sound reproducer, record rotating means in operative relation thereto, and mechanism for transferring records from the top of the batch to the record rotating means and from said means to the elevator when the latter is below high position.

8. In a machine of the class set forth, in combination, a magazine for a batch of disk records including laterally displaceable supports for sustaining the records in a substantially horizontal position, an elevator movable up and down below the batch of records between a low position and a high position that is above the plane of said supports, and means for so moving said elevator and for shifting the supports from beneath the batch of records as the elevator approaches high position, a sound reproducer, record rotating means in operative relation thereto, and mechanism for tranferring records from the top of the batch to the record rotating means and from said means to the elevator when the latter is below high position.

9. In a machine of the class set forth, in combination, a magazine for a batch of disk records including laterally displaceable supports for sustaining the records in a substantially horizontal position, an elevator movable up and down below said batch of records between a low position and a high position that is above the plane of said supports, means for so moving said elevator, further means for shifting the supports, a master element for operating both said means in such timed relation that the supports are withdrawn from beneath the batch of records as the elevator approaches high position, a sound reproducer, record rotating means in operative relation thereto, and mechanism for transferring records from the top of the batch to the record rotating means and from said means to the elevator when the latter is below high position.

10. In a machine of the class set forth, in combination, a magazine for a batch of disk records including laterally displaceable supports for sustaining the records in a substantially horizontal position, an elevator movable up and down below the batch of records between a low position and a high position that is above the plane of said supports, a master shaft, means for rotating the same, elements on the shaft for effecting the up and down movement of the elevator and for shifting the supports from beneath the batch of records as the elevator approaches high position, a sound reproducer, record rotating means in operative relation thereto, and mechanism for transferring records from the top of the batch to the record rotating means and from said means to the elevator when the latter is below high position.

11. In an automatic graphophone, a magazine for holding a plurality of disk records in horizontal position one above another, record rotating means, a sound reproducer in operative relation thereto, laterally spaced parallel rails constituting a track along which records are adapted to be moved to the magazine, mechanism for delivering records to the rotating means and for shifting them therefrom to the track, guides disposed between the rails of the tracks and spaced apart longitudinally thereof, a flexible element supported by said guides so that a part of the element is disposed between the vertical planes of and parallel to the rails, means for driving the flexible element, and a pusher on the flexible element for engaging a record on the track and advancing it toward the magazine.

12. In an automatic graphophone, a magazine for records, record rotating means, and record reversing means, a sound reproducer in operative relation to said record rotating means, mechanism for transferring records from the magazine to the rotating means and from the rotating means to the reversing means, a master element, actuators rigid therewith for effecting the operation of the rotating means and for operating the transfer mechanism, and driving means for the master element.

13. In an automatic graphophone, a magazine for records, record rotating means, and record reversing means, a sound reproducer movable into operative relation to a record on said record rotating means, mechanism for transferring records from the magazine to the record rotating means and from the record rotating means to the record reversing means, a master element, actuators rigid therewith for effecting the operation of the rotating means and the transfer mechanism and for presenting the sound reproducer to a record on said rotating means, and driving means for the master element.

14. In an automatic graphophone, a magazine for records, record rotating means, and record reversing means, a sound reproducer in operative relation to said record rotating means, mechanism for transferring records from the magazine to the record rotating means and from the record rotating means to the record reversing means, a master element, actuators rigid therewith for effecting the operation of the record rotating means and the transfer mechanism, driving means for the master element and a control for said driving means operated by the master element.

15. In an automatic graphophone, a magazine for records, record rotating means, and record reversing means, a sound reproducer for cooperation with and adapted to be moved by the sound groove of a record, mechanism for transferring records from the magazine to the record rotating means and from the record rotating means to the record reversing means, a master element incorporating actuators for governing the operation of the rotating means and for operating the transfer mechanism, driving means for the master element, a control actuated by the sound reproducer when the latter approaches the center of the record for setting the driving means in operation, and a second control operated by the master element through which the driving means is stopped.

16. In an automatic graphophone, a magazine incorporating record elevating means, record rotating means, and record reversing means, a sound reproducer in operative relation to the record rotating means, means for transferring records from the magazine to the rotating means and from the rotating means to the record reversing means, a master element incorporating actuators for governing the operation of the record rotating means, operating the transfer mechanism, and actuating the elevating means, and means for driving the master element.

17. In an automatic graphophone, a magazine for records incorporating record elevating and sustaining means, record rotating means, and record reversing means, a sound reproducer in operative relation to said record rotating means, mechanism for transferring records from the magazine to the rotating means and from the rotating means to the record reversing means, a master element incorporating actuators for governing the operation of the rotating means, operating the transfer mechanism and the record elevating and sustaining means, and means for driving the master element.

18. In an automatic graphophone, a magazine for records, a horizontal turntable, and a record reversing means, a sound reproducer in operative relation to said turntable, means for raising and lowering the sound reproducer into and out of contact with a record on the turntable, mechanism for transferring the records from the magazine to the turntable and from the turntable to the record reversing means, said mechanism including a shaft, a cam on said shaft, operative connections between the cam and the aforesaid sound reproducer raising and lowering means, and driving means for said shaft.

19. In an automatic graphophone, a magazine for records, record rotating means, and record reversing means, a sound reproducer in operative relation to said rotating means, means for transferring records from the magazine to the rotating means and from the rotating means to the record reversing means, restraining means for holding the record rotating means against movement, a master element incorporating actuators for actuating the restraining means and transfer mechanism, and driving means for the master element.

20. In an automatic praphophone, a magazine for records, record rotating means, and record reversing means, a sound reproducer in operative relation to said record rotating means, mechanism for transferring a record from the magazine to the rotating means and from the rotating means to the reversing means, mechanism for transferring a record from the reversing means to the bottom of the magazine, a master element incorporating actuators for governing the operation of the record rotating means and for operating the several record transfer mechanism, and driving means for the master element.

THOMAS WALTER SMALL.